A. Edwards.
Felling Trees.
N° 75,882.            Patented Mar 24. 1868.
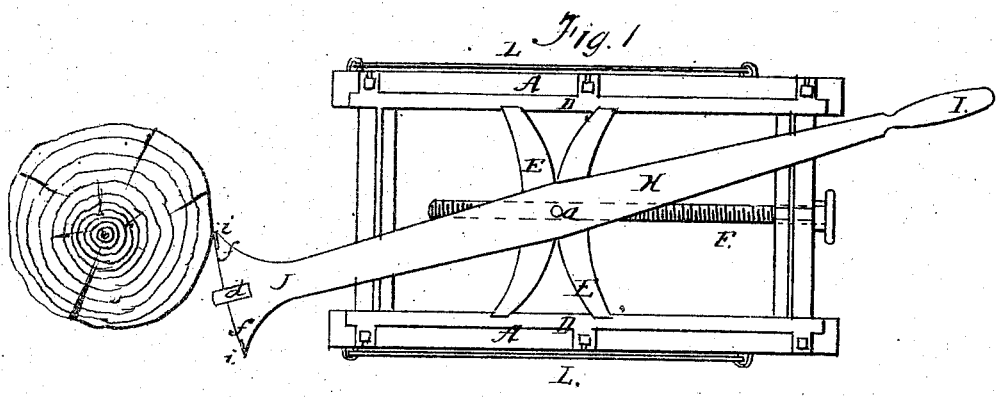
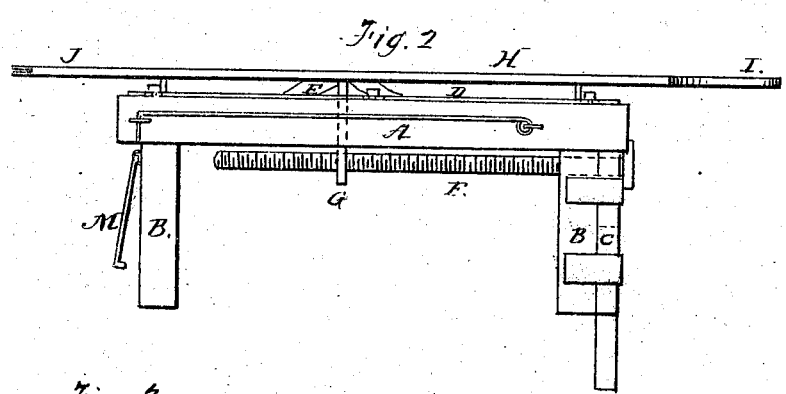
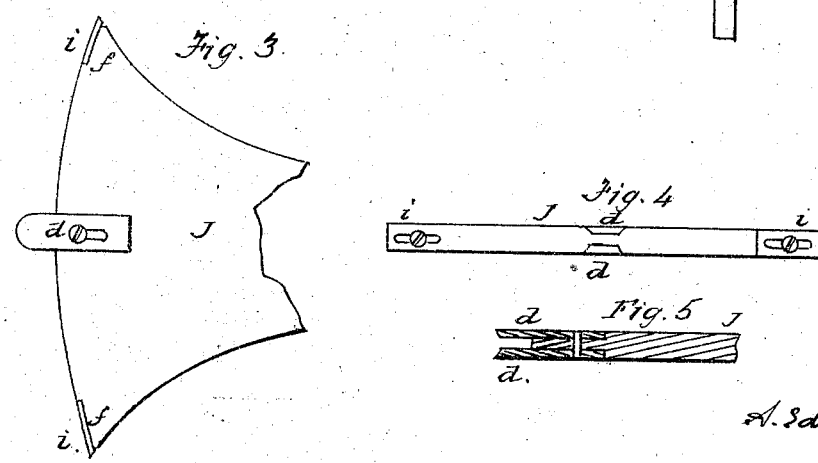
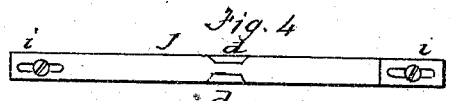
attest
A. J. Tibbitts
John H. Shumway
A. Edwards
Inventor,
By his Attorney
John E. Earle

United States Patent Office.

A. EDWARDS, OF NEW HAVEN, CONNECTICUT.

Letters Patent No. 75,882, dated March 24, 1868.

IMPROVEMENT IN MACHINES FOR FELLING TREES.

*The Schedule referred to in these Letters Patent and making part of the same.*

TO ALL WHOM IT MAY CONCERN:

Be it known that I, A. EDWARDS, of New Haven, in the county of New Haven, and State of Connecticut, have invented a new Improvement in Apparatus for Felling Trees; and I do hereby declare the following, when taken in connection with the accompanying drawings, and the letters of reference marked thereon, to be a full, clear, and exact description of the same, and which said drawings constitute part of this specification, and represent, in—

Figure 1, a top view.
Figure 2, a side view.
Figure 3, a top view of the cutters enlarged.
Figure 4, an end view of the same; and, in
Figure 5, a longitudinal central section of the same.

This invention is designed for cutting trees, logs, or similar cutting, which is commonly done by use of the axe or common cross-cut saw, and consists in the peculiar construction and arrangement of the cutters; and, in order to the clear understanding of my invention, as well as to enable others to construct the same, I will proceed to a description thereof, as illustrated in the accompanying drawings.

A is a frame, supported upon legs, B, so as to be set in a convenient position relative to the thing to be cut, and, in order to adjust the said frame to any unevenness of the resting-surface, I place upon two or more of the legs an auxiliary leg, C, arranged so as to make the said leg longer, as denoted in red, fig. 2, by sliding the leg C downward, and securing it in the proper position in any convenient manner.

In proper guides, D, fixed longitudinally on the top of the frame, I arrange a carriage, E, so as to slide freely between the said guides, and moved back and forth therein by the turning of a screw, F, which works in a nut, G, on the said carriage, or by other convenient equivalent device. To the said carriage E is pivoted, at a, a lever, H, extending to the rear, is formed into a handle, I, by which the lever is moved. The other end, J, is spread or made wider, as seen in fig. 1, and more clearly in figs. 3 and 4; and centrally upon the said end J, both above and below, I arrange cutters, d, corresponding to each other, which act as and may be properly termed spur-cutters, and may be made adjustable, as seen in fig. 3, so as to protrude a greater or less distance beyond the end of the head J, and the said end, J, is provided at its two points, f, with cutters, i, (see figs. 3 and 4,) and the head J formed so that the position of the cutters i, relative to the spur-cutters d, is such that when the lever H is moved to the right and left, the cutters i will follow in the path cut by the spur-cutters d, and so that the spur-cutters, in one movement to the right, the cutter in its rear will, on its return, cut out the material scarfed by the spur-cutters in the first movement, and, on such return, the carriage E being moved forward, the spur-cutters cut still deeper, and again, on its return to the right, the front cutter will remove the wood between the scarfs, and so continuing, each cutter i will, in its turn, fed forward by the movement of the carriage, cut away the wood from before it, and the cutters are so moved, by the application of power to the lever H, in any convenient manner, a single man at the handle I being sufficient to cut with great rapidity. If, however, it be preferred, power may be applied to the other arm of the lever, and, by reciprocating movement, work the cutters.

The machine is set in the proper relative position to the tree to be cut, as seen in fig. 1, and there secured in any convenient manner, and, for such security, I provide it with rods, L, and other rods, M, to be attached and firmly fixed to any convenient object near by. When so set, operate the cutters to traverse back and forth, so that the advancing cutter cuts in the path marked by the spurs in their last movement in the opposite direction, and the cutters are fed forward with the movement of the carriage E, by the turning of the screw F, or other convenient equivalent device.

Having thus fully described my invention, what I claim as new and useful, and desire to secure by Letters Patent, is—

The vibrating cutter-head J, provided with spur-cutters, d d, and the cutters i i, and operating so that each of the cutters i i cuts from the path marked by the spur-cutters d, previously moved in an opposite direction by the oscillation of the pivoted lever H, substantially as specified.

A. EDWARDS.

Witnesses:
    A. J. TIBBITS,
    J. H. SHUMWAY.